(12) United States Patent
Fujioka (10) Patent No.: US 11,878,303 B2
(45) Date of Patent: Jan. 23, 2024

(54) SAMPLE CONTAINER HOLDING MECHANISM

(71) Applicant: SHIMADZU CORPORATION, Kyoto (JP)

(72) Inventor: Shingo Fujioka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 688 days.

(21) Appl. No.: 17/047,887

(22) PCT Filed: May 11, 2018

(86) PCT No.: PCT/JP2018/018322
§ 371 (c)(1),
(2) Date: Oct. 15, 2020

(87) PCT Pub. No.: WO2019/215912
PCT Pub. Date: Nov. 14, 2019

(65) Prior Publication Data
US 2021/0111014 A1    Apr. 15, 2021

(51) Int. Cl.
| | |
|---|---|
| *B01L 9/06* | (2006.01) |
| *G01N 30/72* | (2006.01) |
| *H01J 49/04* | (2006.01) |
| *G01D 11/30* | (2006.01) |
| *G01D 11/16* | (2006.01) |
| *G01M 3/32* | (2006.01) |
| *G01M 3/04* | (2006.01) |

(52) U.S. Cl.
CPC .............. *B01L 9/06* (2013.01); *G01D 11/16* (2013.01); *G01D 11/30* (2013.01); *G01N 30/7233* (2013.01); *H01J 49/0409* (2013.01); *B01L 2200/0615* (2013.01); *G01M 3/04* (2013.01); *G01M 3/32* (2013.01)

(58) Field of Classification Search
CPC ..... H01J 49/0409; G01D 11/30; G01D 11/16; G01M 3/04; G01M 3/32; B01L 9/06; B01L 2200/0615
See application file for complete search history.

(56) References Cited

U.S. PATENT DOCUMENTS

2014/0117184 A1*  5/2014  Sharpe ..................... A61J 1/16
                                                                248/313

FOREIGN PATENT DOCUMENTS

| JP | 3121568 U | 5/2006 | |
|---|---|---|---|
| JP | 2017142122 A * | 8/2017 | ............. G01N 35/04 |
| JP | 2018040740 A * | 3/2018 | ............... G01N 1/10 |
| WO | WO-2004073868 A1 * | 9/2004 | ........... B04B 5/0421 |

OTHER PUBLICATIONS

International Search Report for PCT/JP2018/018322 dated Jul. 24, 2018 (PCT/ISA/210).
Written Opinion for PCT/JP2018/018322 dated Jul. 24, 2018 (PCT/ISA/237).

* cited by examiner

*Primary Examiner* — Benjamin R Schmitt
(74) *Attorney, Agent, or Firm* — Sughrue Mion, PLLC (57) ABSTRACT

A sample container holding mechanism is for holding a sample container 6, and includes a hook member 9 and a stopper member 10. The hook member 9 suspends and holds the sample container 6 in a state where the sample container 6 is inclined with respect to a vertical direction. The stopper member 10 restricts the rotation of the sample container 6 when the sample container 6 is rotated around the hook member 9.

3 Claims, 6 Drawing Sheets

SAMPLE CONTAINER HOLDING MECHANISM

CROSS REFERENCE TO RELATED APPLICATIONS

This application is a National Stage of International Application No. PCT/JP2018/018322 filed May 11, 2018.

TECHNICAL FIELD

The present invention relates to a sample container holding mechanism for holding a sample container.

BACKGROUND ART

For example, in mass spectrometers, there is a mass spectrometer which includes a sample container containing a standard sample, and which can tune device parameters by sending out the standard sample from the sample container to perform mass spectrometry (for example, refer to Patent Document 1 below). As the sample container, for example, a sample bottle having an opening portion at the upper end is used, and the opening portion of the sample bottle is covered with a lid member.

Usually, the sample container is installed to extend straight in a vertical direction. A leak tray is provided below the sample container, and when the sample leaks from the sample container, the sample is received by the leak tray. In a case where the sample is received by the leak tray, the sample is detected by a leak sensor attached to the leak tray.

PRIOR ART DOCUMENT

Patent Document

Patent Document 1: Utility Model Registration No. 3121568

SUMMARY OF THE INVENTION

Problems to be Solved by the Invention

In mass spectrometers, there is a mass spectrometer which includes a plurality of sample containers described above. In a case where a plurality of sample containers are installed in the mass spectrometer, it may be preferable to install each sample container in an inclined state with respect to the vertical direction from the viewpoint of securing space and improving maintainability. Therefore, it is conceivable to adopt a configuration in which the sample container is held in an inclined state by utilizing the gravity of the sample container by suspending the sample container with a hook member, for example.

However, in a case of adopting the above configuration, when an external force is applied in a direction of rotating the sample container around the hook member, the lid member may come off from the sample container, and the sample in the sample container may leap out. Such rotation of the sample container around the hook member may cause various other problems in addition to scattering of the sample in the sample container.

The invention has been made in view of the above circumstances, and an object of the invention is to provide a sample container holding mechanism capable of restricting the rotation of the sample container around the hook member.

Means for Solving the Problems (1) A sample container holding mechanism according to the invention is for holding a sample container, and includes a hook member and a stopper member. The hook member suspends and holds the sample container in a state where the sample container is inclined with respect to a vertical direction. The stopper member restricts the rotation of the sample container when the sample container is rotated around the hook member.

With the configuration, the rotation of the sample container around the hook member can be restricted by the stopper member. Accordingly, since the lid member does not come off from the sample container in a case where an external force is applied in a direction of rotating the sample container around the hook member, it is possible to prevent the sample in the sample container from leaping out.

(2) A sample that has leaked from the sample container may be received by the stopper member.

With the configuration, the stopper member can be used to receive the sample that has leaked from the sample container. Therefore, even in a case where the sample leaks from the sample container, it is possible to prevent the surroundings from being contaminated by the sample that has leaked.

(3) The two stopper members may be vertically disposed one above the other. In this case, the upper stopper member may have a first receiving surface that receives the sample that has leaked from the sample container corresponding to the upper stopper member, a first inclined surface that guides the sample received by the first receiving surface to a direction away from the first receiving surface, and a first drain port that causes the sample flowing on the first inclined surface to fall. Further, the lower stopper member may have a second receiving surface that receives the sample that has leaked from the sample container corresponding to the lower stopper member, a second inclined surface that receives and guides the sample that has fallen from the first drain port to the second receiving surface side, and a second drain port that drains the sample flowing on the second receiving surface and the second inclined surface.

With the configuration, by vertically disposing two stopper members one above the other, it is possible to restrict the rotation of the sample container corresponding to each stopper member, and to receive the sample that has leaked from the sample container corresponding to each stopper member. Since all of the samples received by the respective stopper members are finally guided to the second drain port and drained, it is possible to prevent the surroundings from being contaminated by the sample that has leaked.

Particularly, the sample received by the first receiving surface of the upper stopper member falls from the first drain port through the first inclined surface, and is guided to the second drain port through the second inclined surface of the lower stopper member. Therefore, it is possible to effectively prevent the lower sample container from being contaminated by the sample that has leaked from the upper sample container.

(4) A notch for fixing a pipe connected to the sample container may be formed in the stopper member.

With the configuration, since the pipe connected to the sample container is fixed to the notch formed in the stopper member, it is possible to prevent the sample that has leaked from the sample container from flowing to an unintended location through the pipe. Further, by fixing the pipe using the stopper member, it is not necessary to separately provide a member for fixing the pipe, and the manufacturing cost can be reduced.

(5) An opening for visually recognizing the inside of the sample container may be formed in the stopper member to be at a position facing the sample container.

With the configuration, by visually recognizing the inside of the sample container through the opening formed in the stopper member, it is possible to easily check the remaining amount of the sample in the sample container.

Effects of the Invention

According to the invention, the rotation of the sample container around the hook member can be restricted by the stopper member.

MODE FOR CARRYING OUT THE INVENTION

1. Configuration of Liquid Chromatograph Mass Spectrometer

Figure 1:
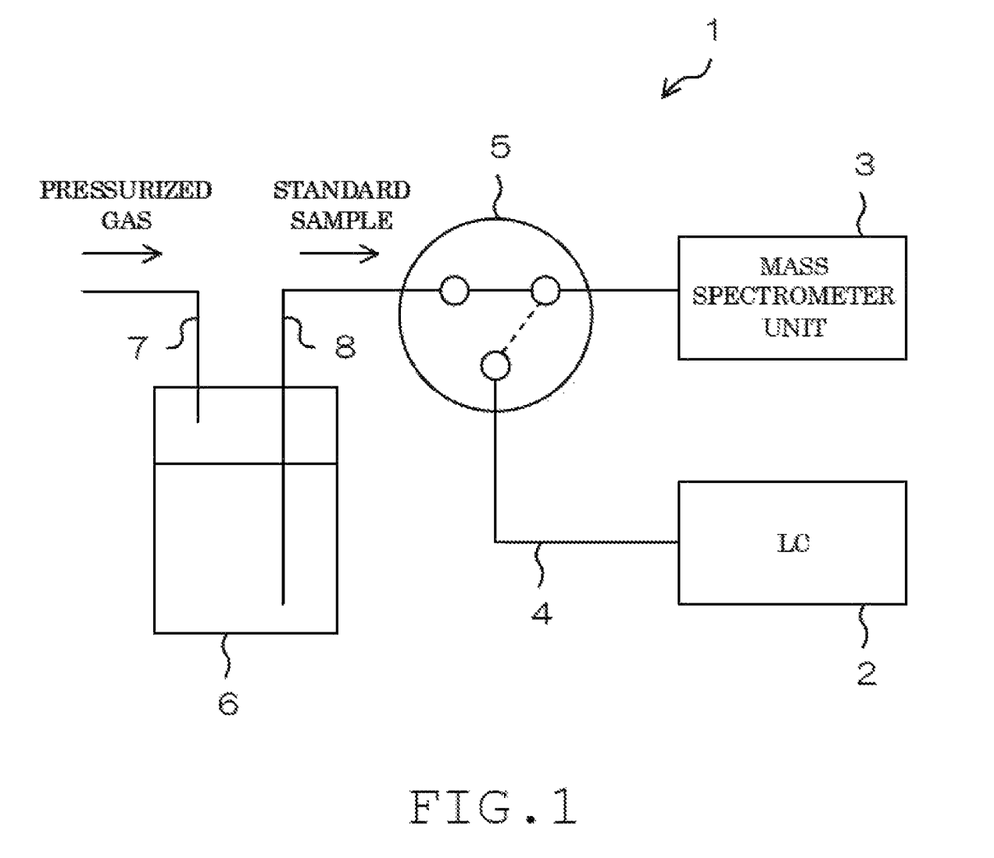
FIG. 1 is a schematic diagram illustrating a configuration of a liquid chromatograph mass spectrometer including a sample container holding mechanism according to an embodiment of the invention.

FIG. 1 is a schematic diagram illustrating a configuration of a liquid chromatograph mass spectrometer 1 including a sample container holding mechanism according to an embodiment of the invention. The liquid chromatograph mass spectrometer 1 is a device in which a liquid chromatograph (LC) 2 for separating components in a sample, and a mass spectrometer unit (MS) 3 for performing mass spectrometry on the sample components separated by the liquid chromatograph 2 are combined.

Although not illustrated, in the liquid chromatograph 2, a mobile phase stored in a storage tank is sent to a column at a constant flow rate. Then, a sample (unknown sample) is injected into the mobile phase, and the sample components contained in the mobile phase are temporally separated in the column. The separated sample components are introduced into the mass spectrometer unit 3 via a pipe 4 and a flow path switching device 5. In the mass spectrometer unit 3, the introduced sample components are ionized, and the ions are separated according to the mass-to-charge ratio (m/z). Then, the separated ions are detected by a detector (not illustrated), and mass spectrometry is performed.

Not only the unknown sample from the liquid chromatograph 2 but also a standard sample can be introduced into the mass spectrometer unit 3. The standard sample is contained in a sample container 6. Pressurized gas is supplied to an upper space (space above the standard sample) in the sample container 6 via a gas supply pipe 7. As a result, the inside of the sample container 6 is pressurized, and the standard sample in the sample container 6 is introduced into the mass spectrometer unit 3 via a sample supply pipe 8 and the flow path switching device 5. The gas supply pipe 7 is formed of, for example, fluororesin. On the other hand, the sample supply pipe 8 is formed of polyether ether ketone (PEEK), for example.

The flow path switching device 5 is a device for switching a flow path communicating with the mass spectrometer unit 3. By switching the flow path using this flow path switching device 5, switching can be performed between a state in which the standard sample is introduced from the sample container 6 to the mass spectrometer unit 3 (state indicated by the solid line in FIG. 1) and a state in which the unknown sample is introduced from the liquid chromatograph 2 to the mass spectrometer unit 3 (state indicated by the broken line in FIG. 1).

Figure 2:
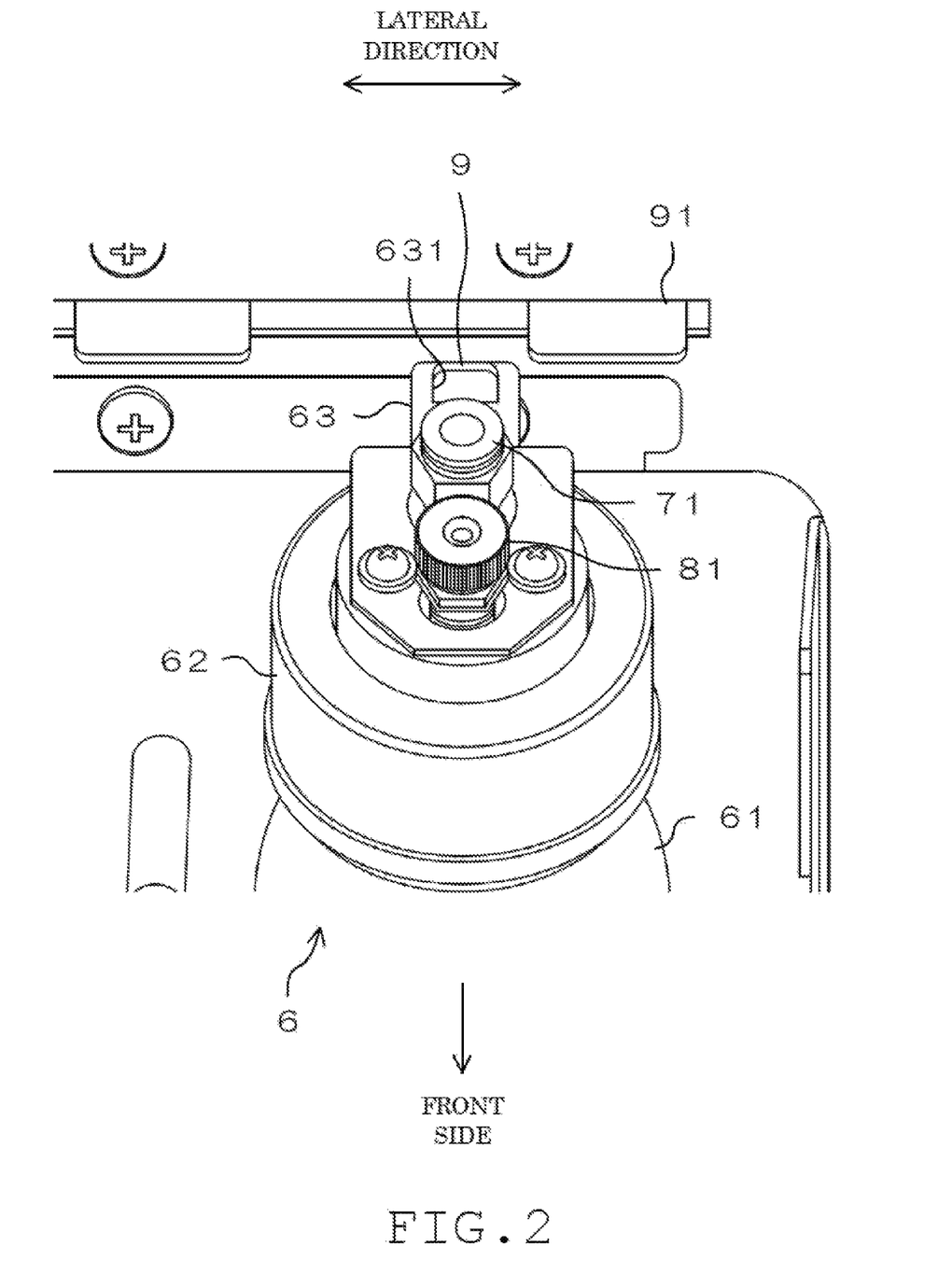
FIG. 2 is a perspective view for describing a hook member.
Figure 3:
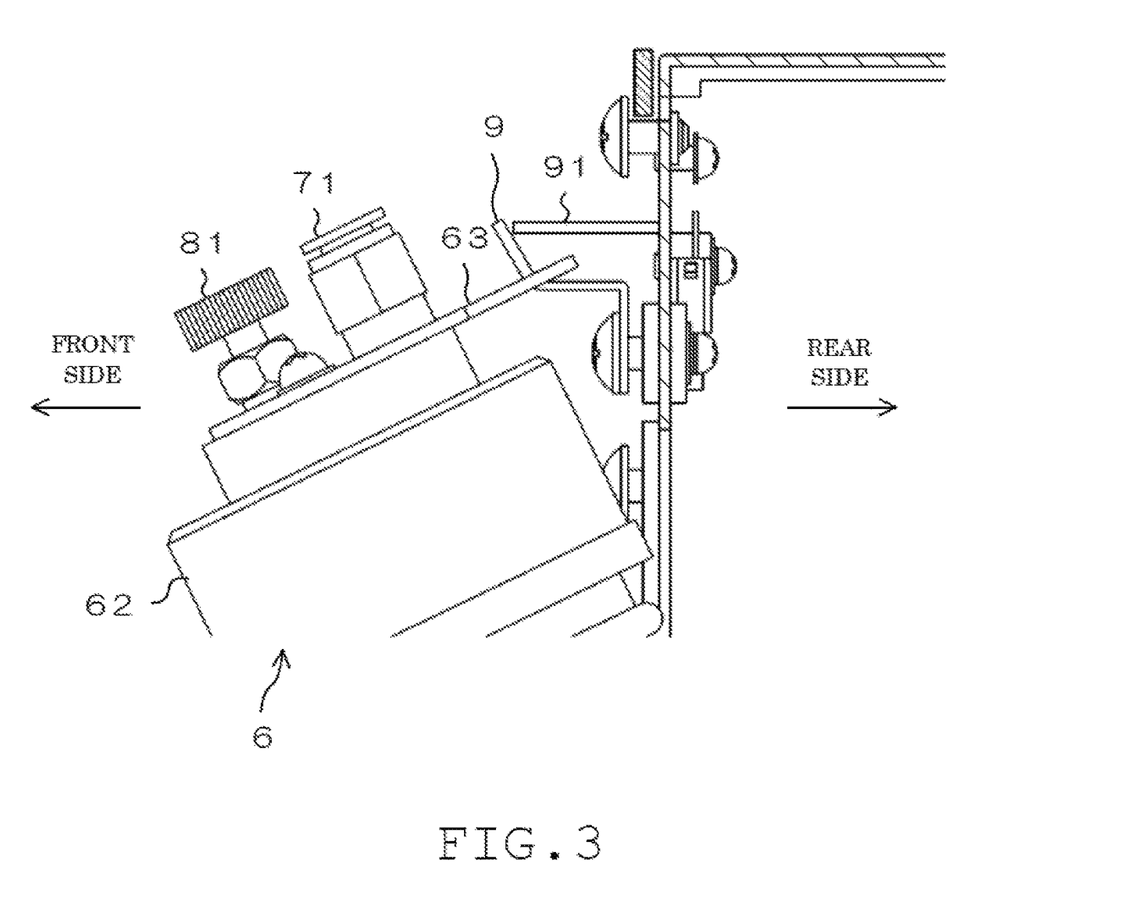
FIG. 3 is a side view for describing the hook member.

2. Configuration of Sample Container Holding Mechanism (1) Configuration Around Hook Member FIG. 2 is a perspective view for describing a hook member 9. FIG. 3 is a side view for describing the hook member 9. The hook member 9 is included in the sample container holding mechanism for holding the sample container 6.

The sample container 6 includes a container body 61 and a lid member 62. The container body 61 is a hollow member having an opening (upper surface opening) on its upper surface, and the standard sample is supplied into the container body 61 from the upper surface opening. The upper surface opening of the container body 61 is closed by the lid member 62 formed of resin, for example. The lid member 62 is attachable to and detachable from the container body 61 by a screwing type or a fitting type.

A gas connection portion 71 to which the gas supply pipe 7 is connected and a sample connection portion 81 to which the sample supply pipe 8 is connected are provided on the upper surface of the lid member 62. Further, a locking portion 63 that is attachable to and detachable from the hook member 9 is provided on the upper surface of the lid member 62. The locking portion 63 is formed of a metal plate-shaped member, and the hook member 9 is inserted into an opening portion 631 formed in a part of the locking portion 63. The opening portion 631 is formed at a position eccentric to the central axis of the container body 61.

The hook member 9 is a metal plate-shaped member having a bent or curved shape, and the tip end portion of the hook member 9 extends obliquely upward. The sample container 6 is held in a state of being suspended by the hook member 9 by inserting the hook member 9 into the opening portion 631 of the locking portion 63. In this state, due to the gravity of the sample container 6, the sample container 6 is held in a state of being inclined with respect to the vertical direction. Specifically, the sample container 6 is inclined such that the position of the upper surface opening of the container body 61 becomes lower as the distance from the hook member 9 to the front side is increased.

The gas connection portion 71 and the sample connection portion 81 are disposed side by side to the front side in a straight line with respect to the opening portion 631 of the locking portion 63. The sample connection portion 81 is provided at a position farther from the opening portion 631 than the gas connection portion 71, and thus is disposed at a position lower than the gas connection portion 71. Therefore, in a case where there is a problem in the connection of the sample supply pipe 8 to the sample connection portion 81 and the standard sample leaks from the sample connection portion 81 to the outside, the standard sample falls downward from the front side of the lid member 62.

The hook member 9 is slidably held along a lateral direction (refer to FIG. 2) which is a horizontal direction orthogonal to a front-rear direction. Further, a lock mechanism 91 for locking the locking portion 63 to cause the locking portion 63 not to come off from the hook member 9 is provided in the vicinity of the hook member 9. In this example, the lock mechanism 91 is composed of a plate-shaped member fixed to extend in the horizontal direction.

The hook member 9 is slidable in the lateral direction so that the hook member 9 can be moved between a lock release position (refer to FIG. 2) separated from the lock mechanism 91 and a lock position (refer to FIG. 3) close to the lock mechanism 91. In the lock release position illustrated in FIG. 2, since the tip end portion of the hook member 9 does not face the lock mechanism 91, the locking portion 63 can be freely attached to and detached from the hook member 9. On the other hand, in the lock position illustrated in FIG. 3, the tip end portion of the hook member 9 faces the lock mechanism 91 to cause a locked state in which locking portion 63 cannot be removed from the hook member 9.

(2) Configuration of Stopper Member

Figure 4:
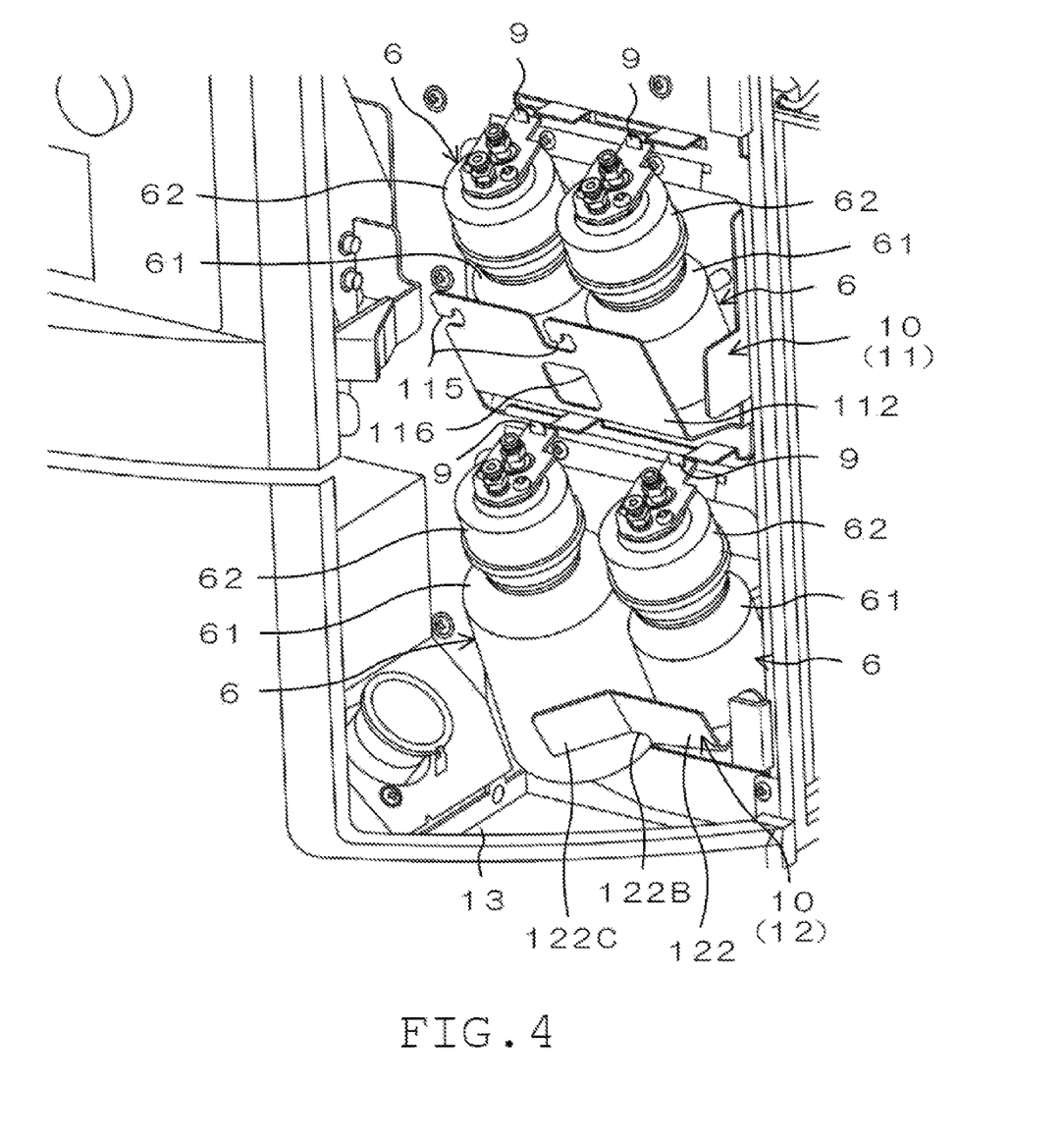
FIG. 4 is a perspective view for describing a stopper member, and illustrates a state in which the sample container is held.
Figure 5:
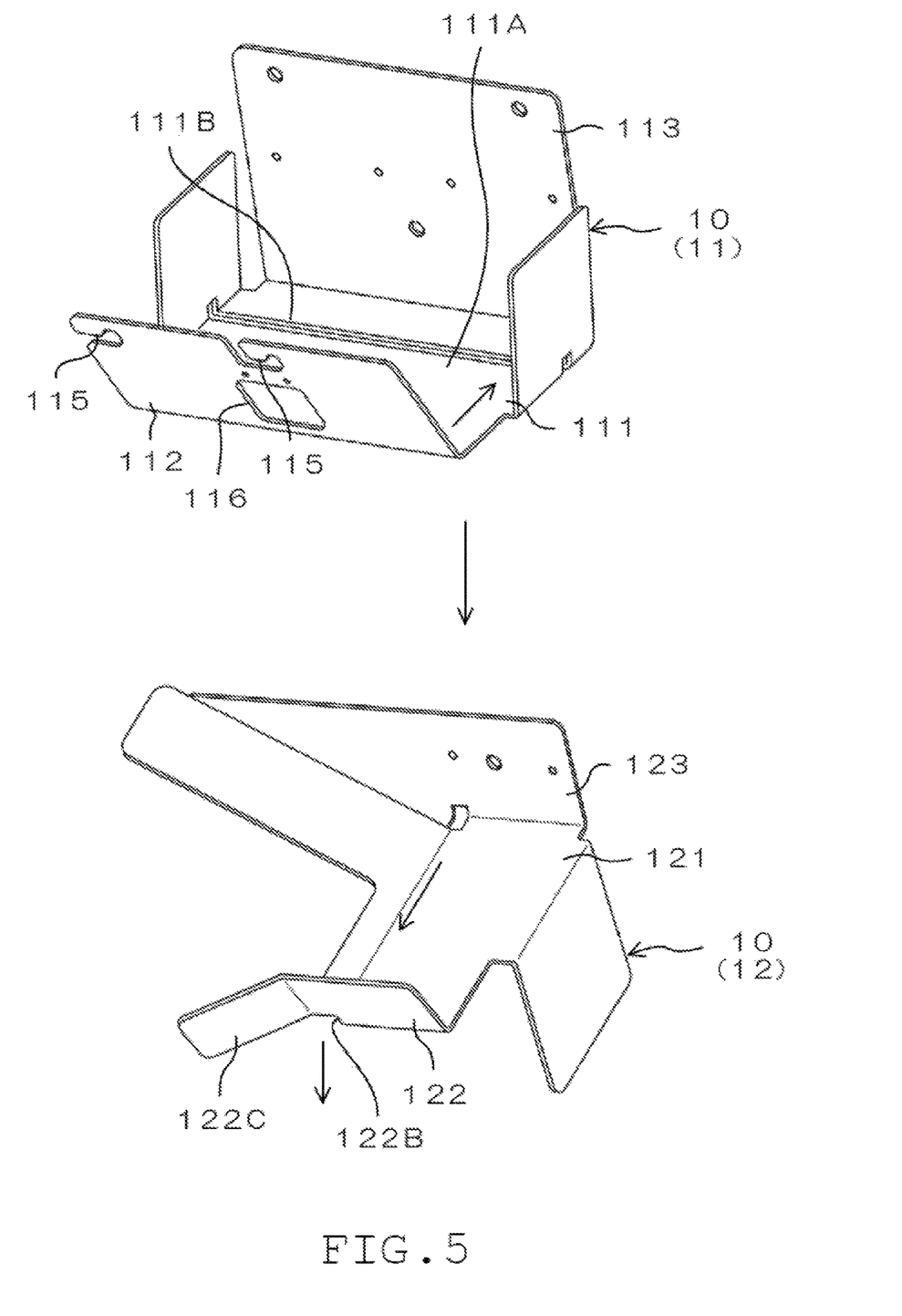
FIG. 5 is a perspective view for describing the stopper member, and illustrates only a configuration of the stopper member.
Figure 6:
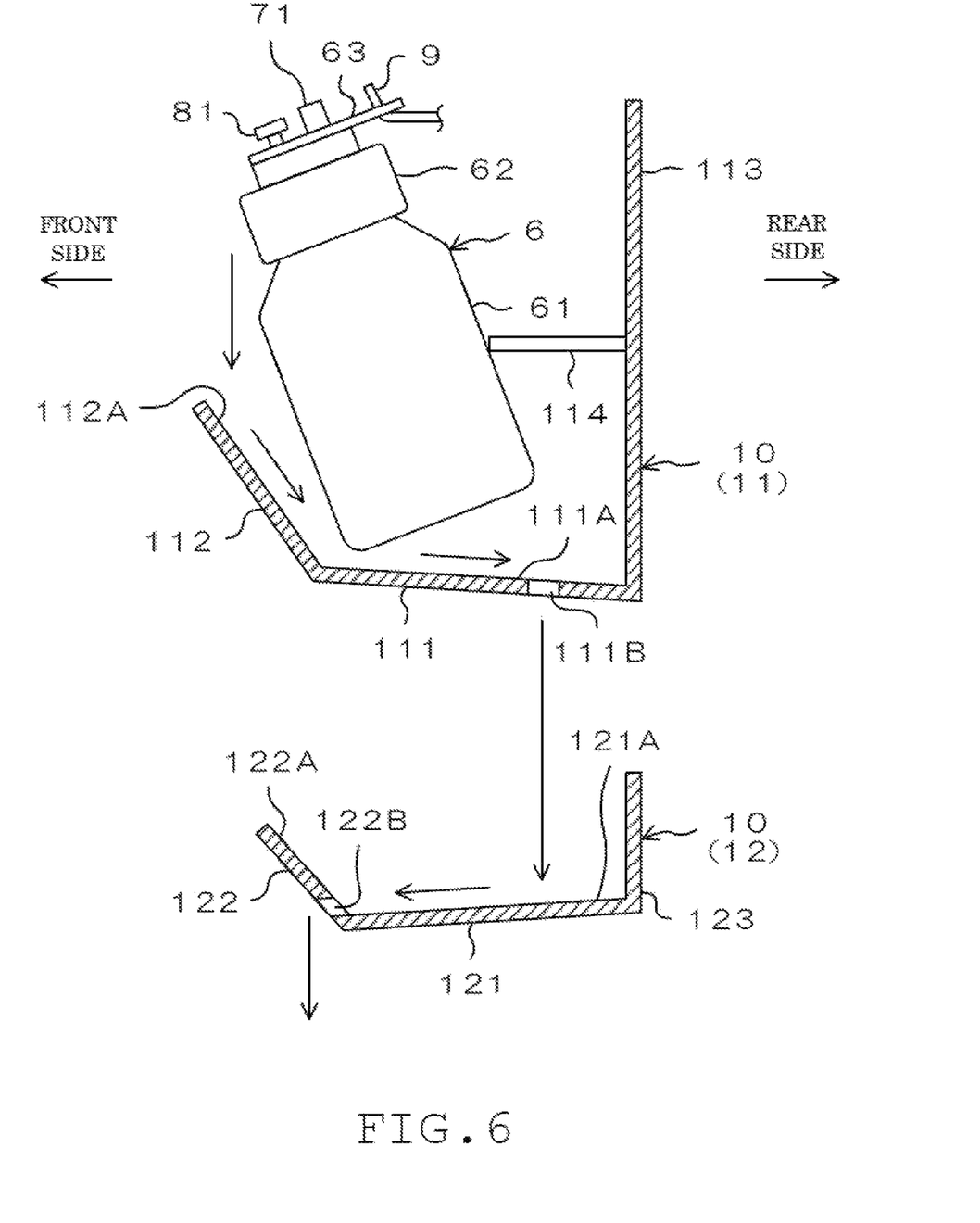
FIG. 6 is a schematic sectional view for describing the stopper member.

FIG. 4 is a perspective view for describing a stopper member 10, and illustrates a state in which the sample container 6 is held. FIG. 5 is a perspective view for describing the stopper member 10, and illustrates only a configuration of the stopper member 10. FIG. 6 is a schematic sectional view for describing the stopper member 10. The stopper member 10 is included, together with the hook member 9, in the sample container holding mechanism for holding the sample container 6.

In the present embodiment, two stopper members 10 (first stopper member 11 and second stopper member 12) that are vertically disposed one above the other are provided. The stopper members 11 and 12 are for restricting the rotation of the sample container 6 by being in contact with the sample container 6 when the sample container 6 rotates around the hook member 9.

The upper stopper member 10 (first stopper member 11) is disposed to face the two sample containers 6 installed in the upper stage. These two sample containers 6 have, for example, the same shape, and are held in a state of being suspended by different hook members 9, respectively.

The lower stopper member 10 (second stopper member 12) is disposed to face the two sample containers 6 installed in the lower stage. These two sample containers 6 have, for example, different shapes, and are held in a state of being suspended by different hook members 9, respectively.

The first stopper member 11 is formed by bending a metal plate-shaped member or causing a metal plate-shaped member to be curved. The first stopper member 11 has a bottom surface portion 111, a front surface portion 112, a rear surface portion 113, and the like. The bottom surface portion 111, the front surface portion 112, and the rear surface portion 113 are integrally formed to be continuous with each other.

The bottom surface portion 111 is slightly inclined with respect to the horizontal direction so as to be gradually lower toward the rear side. The front surface portion 112 extends obliquely upward from the front end side of the bottom surface portion 111, and the tip end of the front surface portion 112 is located in front of the sample container 6. The rear surface portion 113 extends vertically upward from the rear end side of the bottom surface portion 111.

A plurality of spacers 114 protruding to the front side are attached to the rear surface portion 113 (refer to FIG. 6). The tip end of each spacer 114 is in contact with the container body 61 of the sample container 6 suspended from the hook member 9 from behind. As a result, the lower portion of the sample container 6 is pushed to the front side against the gravity of the sample container 6, and the sample container 6 is held at a constant inclination angle.

With the first stopper member 11 as described above, in a case where the standard sample leaks from the sample connection portion 81 of the sample container 6 or the like, the standard sample that has leaked can be received by the front surface portion 112 of the first stopper member 11. That is, the upper surface of the front surface portion 112 of the first stopper member 11 (the surface on the sample container 6 side) constitutes a first receiving surface 112A that receives the standard sample that has leaked from the sample container 6 corresponding to the first stopper member 11.

The standard sample received by the first receiving surface 112A flows to the rear side along the first receiving surface 112A, and further flows to the rear side along the upper surface of the bottom surface portion 111. The upper surface of the bottom surface portion 111 constitutes a first inclined surface 111A that guides the standard sample received by the first receiving surface 112A in a direction away from the first receiving surface 112A.

A slit-shaped first drain port 111B extending in the lateral direction is formed on the rear end side of the bottom surface portion 111. The first drain port 111B is formed to extend from one end to the other end of the bottom surface portion 111 in the lateral direction. The standard sample flowing to the rear side on the first inclined surface 111A falls downward from the first drain port 111B.

The second stopper member 12 is formed by bending a metal plate-shaped member or causing a metal plate-shaped member to be curved. The second stopper member 12 has a bottom surface portion 121, a front surface portion 122, a rear surface portion 123, and the like. The bottom surface portion 121, the front surface portion 122, and the rear surface portion 123 are integrally formed to be continuous with each other.

The bottom surface portion 121 is slightly inclined with respect to the horizontal direction so as to be gradually lower toward the front side. The front surface portion 122 extends obliquely upward from the front end side of the bottom surface portion 121. The rear surface portion 123 extends vertically upward from the rear end side of the bottom surface portion 121. Similar to the first stopper member 11, a spacer (not illustrated) for pushing the sample container 6 to the front side is attached to the rear surface portion 123. In the present embodiment, a bent piece 122C for receiving a relatively large sample container 6 is formed by obliquely bending a part of the front surface portion 122 to the front side.

The upper surface of the front surface portion 122 of the second stopper member 12 (the surface on the sample container 6 side) constitutes a second receiving surface 122A that receives the standard sample that has leaked from the sample container 6 (not illustrated in FIG. 6) corresponding to the second stopper member 11. The standard sample received by the second receiving surface 122A flows to the rear side on the second receiving surface 122A, and is drained downward from a second drain port 122B formed at a joint between the bottom surface portion 121 and the front surface portion 122.

Further, the standard sample that has fallen from the first drain port 111B of the first stopper member 11 is received by the upper surface of the bottom surface portion 121 of the second stopper member 12, and flows to the front side along the upper surface. The upper surface of the bottom surface portion 121 constitutes a second inclined surface 121A that guides the standard sample falling from the first drain port 111B to the second receiving surface 122A side. The standard sample flowing to the front side on the second inclined surface 121A is drained downward from the second drain port 122B.

A leak tray 13 is provided below the second drain port 122B (refer to FIG. 4). Therefore, the standard sample received by the first receiving surface 112A of the first stopper member 11 and the second receiving surface 122A of the second stopper member 12 is all drained to the leak tray 13 via the second drain port 122B. In the present embodiment, the standard sample that has leaked from the relatively large sample container 6 facing the bent piece 122C directly falls onto the leak tray 13.

A notch 115 is formed in the front surface portion 112 of the first stopper member 11. The notch 115 is a recess formed in the edge of the front surface portion 112, and extends, for example, in an L shape or a J shape from the edge. The notch 115 constitutes a fixing portion for fixing the pipe connected to the sample container 6. That is, the pipe such as the gas supply pipe 7 or the sample supply pipe 8 connected to the sample container 6 is fixed so as to be close to the first stopper member 11 by being hooked to pass through the notch 115.

In this example, two notches 115 are formed in the front surface portion 112, but the number of notches 115 may be one, or may be three or more. Further, the notch 115 may be formed at another position of the first stopper member 11 without being limited to the front surface portion 112. The notch 115 may be formed in the second stopper member 12 without being limited to the first stopper member 11.

An opening 116 is formed in the front surface portion 112 of the first stopper member 11. The opening 116 is formed at a position facing the sample container 6. Therefore, the inside of the sample container 6 located on the rear side of the first stopper member 11 can be visually recognized from the front side of the first stopper member 11 through the opening 116.

In this example, one opening 116 is formed in the front surface portion 112, but the number of openings 116 may be two or more. Further, the opening 116 may be formed at another position of the first stopper member 11 without being limited to the front surface portion 112. The opening 116 may be formed in the second stopper member 12 without being limited to the first stopper member 11.

3. Effects (1) In the present embodiment, the rotation of the sample container 6 around the hook member 9 can be restricted by the stopper member 10 (first stopper member 11 and second stopper member 12). Accordingly, since the lid member 62 does not come off from the sample container 6 in a case where an external force is applied in a direction of rotating the sample container 6 around the hook member 9, it is possible to prevent the standard sample in the sample container 6 from leaping out.

(2) In the present embodiment, the stopper member 10 (first receiving surface 112A and second receiving surface 122A) can be used to receive the standard sample that has leaked from the sample container 6. Therefore, even in a case where the standard sample leaks from the sample container 6, it is possible to prevent the surroundings from being contaminated by the standard sample that has leaked.

(3) In the present embodiment, by vertically disposing two stopper members 10 (first stopper member 11 and second stopper member 12) one above the other, it is possible to restrict the rotation of the sample container 6 corresponding to each stopper member 10, and to receive the standard sample that has leaked from the sample container 6 corresponding to each stopper member 10. Since all of the standard samples received by the respective stopper members 10 are finally guided to the second drain port 122B and drained, it is possible to prevent the surroundings from being contaminated by the standard sample that has leaked.

Particularly, the standard sample received by the first receiving surface 112A of the upper stopper member 10 (first stopper member 11) falls from the first drain port 111B through the first inclined surface 111A, and is guided to the second drain port 122B through the second inclined surface 121A of the lower stopper member 10 (second stopper member 12). Therefore, it is possible to effectively prevent the lower sample container 6 from being contaminated by the standard sample that has leaked from the upper sample container 6.

(4) In the present embodiment, since the pipe (gas supply pipe 7, sample supply pipe 8, or the like) connected to the sample container 6 is fixed to the notch 115 formed in the stopper member 10, it is possible to prevent the standard sample that has leaked from the sample container 6 from flowing to an unintended location through the pipe. Further, by fixing the pipe using the stopper member 10, it is not necessary to separately provide a member for fixing the pipe, and the manufacturing cost can be reduced.

(5) Further, in the present embodiment, by visually recognizing the inside of the sample container 6 through the opening 116 formed in the stopper member 10, it is possible to easily check the remaining amount of the standard sample in the sample container 6.

4. Modification

The sample container 6 may be a container that stores any other sample such as an unknown sample, without being limited to the container that stores the standard sample.

The stopper member 10 is not limited to have the configuration in which two of the first stopper member 11 and the second stopper member 12 are provided, but may have a configuration in which one or three or more stopper members 10 are provided. Further, the shape of the stopper member 10 is not limited to the shape as in the above-described embodiment, and any other shape may be adopted as long as the shape can restrict the rotation of the sample container 6.

DESCRIPTION OF REFERENCE SIGNS 6 sample container
7 gas supply pipe
8 sample supply pipe
9 hook member
10 stopper member
11 first stopper member
12 second stopper member
61 container body
62 lid member
63 locking portion
71 gas connection portion
81 sample connection portion
111 bottom surface portion
111A first inclined surface
111B first drain port
112 front surface portion 112A first receiving surface
113 rear surface portion
114 spacer
115 notch
116 opening
121 bottom surface portion
121A second inclined surface
122 front surface portion
122A second receiving surface
122B second drain port
123 rear surface portion

The invention claimed is:

1. A sample container holding mechanism for holding a sample container, comprising:
   a hook member that suspends and holds the sample container in a state where the sample container is inclined with respect to a vertical direction; and
   a stopper member that restricts rotation of the sample container by being in contact with the sample container when the sample container is rotated around the hook member; wherein
   a sample that has leaked from the sample container is received by the stopper member,
   the two stopper members are vertically disposed one above the other,
   the upper stopper member has
   a first receiving surface that receives the sample that has leaked from the sample container corresponding to the upper stopper member,
   a first inclined surface that guides the sample received by the first receiving surface to a direction away from the first receiving surface, and
   a first drain port that causes the sample flowing on the first inclined surface to fall, and the lower stopper member has
   a second receiving surface that receives the sample that has leaked from the sample container corresponding to the lower stopper member,
   a second inclined surface that receives and guides the sample that has fallen from the first drain port to the second receiving surface side, and
   a second drain port that drains the sample flowing on the second receiving surface and the second inclined surface.

2. A sample container holding mechanism for holding a sample container, comprising:
   a hook member that suspends and holds the sample container in a state where the sample container is inclined with respect to a vertical direction; and
   a stopper member that restricts rotation of the sample container by being in contact with the sample container when the sample container is rotated around the hook member wherein
   a notch for fixing a pipe connected to the sample container is formed in the stopper member.

3. A sample container holding mechanism for holding a sample container, comprising:
   a hook member that suspends and holds the sample container in a state where the sample container is inclined with respect to a vertical direction; and
   a stopper member that restricts rotation of the sample container by being in contact with the sample container when the sample container is rotated around the hook member; wherein
   an opening for visually recognizing an inside of the sample container is formed in the stopper member to be at a position facing the sample container.

* * * * *